United States Patent

Massey

[15] 3,676,434
[45] July 11, 1972

[54] CEPHALOSPORIN SALTS

[72] Inventor: Eddie H. Massey, Indianapolis, Ind.

[73] Assignee: Eli Lilly and Company, Indianapolis, Ind.

[22] Filed: July 29, 1970

[21] Appl. No.: 59,352

[52] U.S. Cl. .......................................... 260/243 C, 424/246
[51] Int. Cl. ......................................................... C07d 99/24
[58] Field of Search ................................................ 260/243 C

[56] References Cited

UNITED STATES PATENTS 3,278,525  10/1966  Johnson et al. ..................... 260/239.1
3,507,861  4/1970  Morin et al. ......................... 260/243 C Primary Examiner—Nicholas S. Rizzo
Attorney—Everet F. Smith and John T. Reynolds

[57] ABSTRACT

New and improved salts of cephalexin with anthraquinone-1,5-disulfonic acid, anthraquinone-2-sulfonic acid and 1-naphthol-5-sulfonic acid having solubilities in water less than 10 milligrams per milliliter.

4 Claims, No Drawings

CEPHALOSPORIN SALTS

This invention relates to new and improved salts of cephalexin, a potent antibiotic having the basic ring structure of cephalosporin C.

In U. S. Pat. No. 3,507,861, description is made of a new antibiotic of the cephalosporin type, 7-[D-2'-phenyl-2'-aminoacetamido]-desacetoxycephalosporanic acid, hereinafter referred to by its generic name cephalexin, which can be conveniently represented in its zwitterionic form by the formula

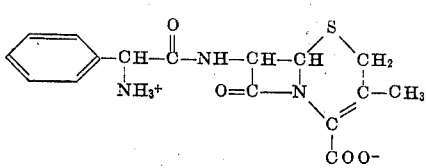

As is described in the aforementioned patent, cephalexin has been found to have a broad range of antibiotic or antibacterial activity against a variety of microorganisms including both Gram-positive and Gram-negative pathogens.

While cephalexin represents a significant breakthrough in the art of cephalosporin antibiotics, it has a solubility in water of about 11 to 13 milligrams per milliliter, which makes it somewhat unsuitable for use in the form of an aqueous suspension as, for example, a ready-to-use pediatric suspension. In addition, because of its water solubility characteristics, cephalexin is rapidly absorbed into the blood stream, thereby making it difficult to maintain a desired level of cephalexin in the blood over prolonged periods.

It has also been found that suspensions of cephalexin in water have a tendency to lose their antibiotic activity over long periods of storage, and thus have a somewhat limited shelf-life, particularly at higher temperatures.

Various procedures have been used in the prior art to promote or provide insolubility in water for antibiotics. For example, in the case of penicillin, penicillin G has been rendered insoluble by reacting it with procaine to form the corresponding salt which is essentially insoluble in water. However, the use of this technique with cephalexin has been found to be unsuitable.

It is accordingly an object of the present invention to provide a cephalexin derivative which is essentially insoluble in water and which has comparable biological activity.

It is a more specific object of the invention to provide a new and improved cephalexin salt which is suitable for use in the form of an aqueous suspension having improved stability and which is characterized by a more moderate rate of absorption into the blood stream.

The concepts of the present invention reside in new and improved salts of cephalexin with certain polynuclear sulfonic acids which are characterized by a solubility in water which is less than 10 milligrams per milliliter. The salts of the present invention include the cephalexin salts of 1-naphthol-5-sulfonic acid, anthraquinone-1,5-disulfonic acid and anthaquinone-2-sulfonic acid. These salts can be conveniently represented by the formulas

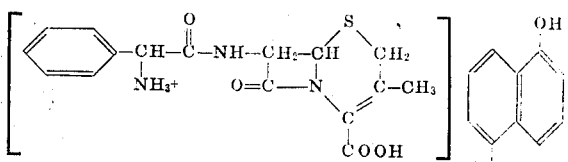

7-(D-2'-phenyl-2'-aminoacetamido)-desacetoxycephalosporanic acid 1-naphthol-5-sulfonate

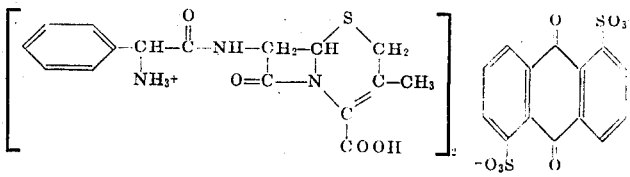

Di-[7-(D-2'-phenyl-2'-aminoacetamido)-desacetoxycephalosporanic acid anthraquinone-1,5-disulfonate

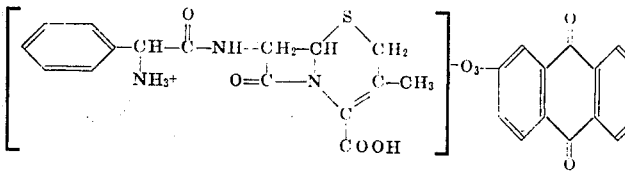

7-(D-2'-phenyl-2'-aminoacetamide)-desacetoxycephalosporanic acid anthraquinone-2-sulfonate On of the surprising features of the salts of the present invention is that they have solubilities less than 10 mg/ml, whereas salts formed from celphalexin and position isomers of the above-described sulfonic acids are relatively soluble in water. For example, the preferred salt of the present invention, the dicephalexin salt of anthraquinone-1,5-disulfonic acid, has a solubility in water of about 1.5 mg/ml., while the dicephalexin salt of anthraquinone-2,6-disulfonic acid has a solubility in water greater than that of cephalexin, that is greater than about 11 to 13 mg/ml. Similarly, the celphalexin salt of anthraquinone-2-sulfonic acid has a solubility in water of about 2 to 3 mg/ml, whereas the corresponding salt of anthraquinone-1-sulfonic acid has a solubility in water greater than 13 mg/ml.

As a result of their extremely low solubility in water, the salts of the present invention can, if desired, be used in the form of an aqueous suspension for, for example, pediatric applications. Aqueous suspensions of the salts of this invention generally have greater stability, and hence a longer shelf life, than free cephalexin, even at higher temperatures of the order of 50° C. In addition, the use of cephalexin in the form of the salts of the invention results in a reduced rate of absorption of cephalexin into the blood stream, thereby making it less difficult to maintain a given level of cephalexin in the blood stream over prolonged periods.

Aqueous suspensions of the cephalexin salts of the present invention can be administered either orally or intramuscularly. It has been found that these salts generally have the same antibiotic or anti-bacterial activity as cephalexin as described in the above-mentioned U. S. Pat. against a wide variety of microorganisms including Gram-positive and Gram-negative pathogens.

The salts of the invention can be prepared by any of a variety of methods for preparing such salts. It is generally preferred to prepare the salts by dissolving cephalexin in a dilute solution of hydrochloric acid, and then adding the sulfonic acid compound in the form of its corresponding alkali metal salt. The resulting salt separates from the reaction mixture almost immediately in the form of water-insoluble crystals.

Having described the basic concepts of the invention, reference is now made to the following examples which are provided by way of illustration, and not by way of limitation, of the practice of the invention.

EXAMPLE 1

Preparation of dicephalexin salt of anthraquinone-1,5-disulfonic acid.

A sample of 10.95 g. of cephalexin monohydrate prepared in accordance with U. S. Pat. No. 3,507,861 is dissolved in 300 ml. of 0.1 N HCl. Thereafter, a solution of 6.18 g. of the disodium salt of anthraquinone-1,5-disulfonic acid is added dropwise to the cephalexin solution, resulting in the almost immediate precipitation of pale yellow crystals. The crystalline precipitate is separated from the solution by filtration, and washed with water.

The crystals are found to have a solubility of about 1.5 to 2.0 mg/ml, and melting point tests reveal that the product decomposes at 210°–220° C. The product is identified as

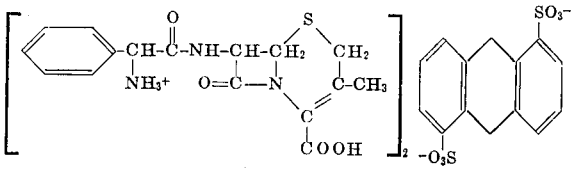

in hydrated form.

EXAMPLE 2

Stability of dicephalexin - anthraquinone-1,5-disulfonic acid salt in suspension.

The stability of the dicephalexin salt of anthraquinone-1,5-disulfonic acid as compared to free cephalexin is determined by preparing aqueous suspensions of the salt prepared in the manner described in Example 1 and cephalexin prepared in the manner described in the aforementioned U. S. patent, and storing the resulting suspensions at various temperatures for varying periods of time. The stability of each suspension is determined as cephalexin activity per 5 ml., and tabulated below:

Cephalexin activity per 5 ml.

| Suspension | Initial Activity | temp.25°C 1 week | temp.25°C 1 month | temp. 37° C 1 month | temp. 50° C 12 days |
|---|---|---|---|---|---|
| Cephalexin | 90.2 | 81.4 | 68.8 73.0 76.4 | 23.0 19.8 | 21.3 20.0 20.8 |
| Dicephalexin salt of anthraquinone-1,5-disulfonic acid | 94.0 | 94.5 | 95.6 88.0 99.5 | 90.0 86.0 98.5 | 84.0 92.0 85.5 |

It will be observed from the foregoing that the salt of this invention has a significantly improved stability in aqueous suspension as compared to caphalexin, even at temperatures as high as 50° C.

EXAMPLE 3

Determination of rates of absorption of the dicephalexin salt of anthraquinone-1,5-disulfonic acid.

The dicephalexin salt of anthraquinone-1,5-disulfonic acid is administered orally and intramuscularly to dogs at a dose which is representative of the use of the salts of this invention of 10 mg/kg. based on the cephalexin content of the salt. The oral doses are given by capsule and by gavage of an aqueous suspension containing 4.15 percent by weight of the salt, and the intramuscular injections are made using a 16.6 percent by weight aqueous suspension of the salt.

Blood sera samples are taken from the dogs at various intervals after administration, and are assayed against *S.lotea* by a disc-plate method using cephalexin as a standard. The results of this assay are shown below in the following table along with the results of test conducted in the same manner using cephalexin. The data is based upon a mean for three dogs.

| Sample | Mode of Administration | Mean concentration of cephalexin in blood Serum ($\mu$g/ml.) Hours after Administration | | | | | | | | |
|---|---|---|---|---|---|---|---|---|---|---|
| | | .5 | 1.0 | 1.5 | 2.0 | 3.0 | 4.0 | 5.0 | 6.0 | 24.0 |
| Dicephalexin salt | Oral – capsules | 5.8 | 15.1 | 17.5 | 15.1 | 15.9 | 9.5 | 8.1 | 7.7 | 0.5 |
| | Oral – gavage | 3.3 | 11.8 | 16.9 | 16.6 | 13.0 | 10.1 | 7.0 | 5.0 | 0.4 |
| | Intramuscular | 4.3 | 9.5 | 12.0 | 13.0 | 14.7 | 11.9 | 11.0 | 7.9 | 0.4 |
| Cephalexin | Oral – capsules | 2.3 | 8.3 | 12.0 | 17.0 | 14.2 | 12.0 | 7.9 | 5.4 | |
| | Intramuscular | 21.6 | 20.0 | 12.5 | 10.7 | 7.6 | 4.7 | 3.9 | 2.6 | |

The foregoing illustrates that the dicephalexin salt of this invention is absorbed into the blood stream at a much more uniform rate, resulting in a more constant cephalexin level in the blood stream of the dogs.

Urine samples are also taken from the dogs to which the dicephalexin salt is administered, and assayed for antibiotic activity by the same tests described above. The results are expressed as the mean percent recovery of the administered dose in the urine over various time intervals after administration, based upon the mean recovery for three dogs.

| Mode of administration | Mean % recovery of administered dose in urine Hours after Dose | | | |
|---|---|---|---|---|
| | 0–2 | 2–4 | 4–6 | 6–24 0–24 |
| Dicephalexin salt Oral - capsules | 20.8 | 21.7 | 9.9 | 9.7 62.1 |
| Oral - gavage | 17.4 | 24.4 | 14.2 | 9.2 65.2 |
| Intramuscular | 11.3 | 27.8 | 17.1 | 15.4 71.6 |

EXAMPLE 4

Determination of acute toxicity of dicephalexin salt of anthraquinone-1,5-disulfonic acid.

The acute oral and intraperitoneal toxicity of decephalexin anthraquinone-1,5-disulfonate in mice as compared to that of cephalexin and the disodium salt of anthraquinone-1,5-disulfonic acid is studied by way of the following tests.

The dicephalexin salt is formulated into a carrier to provide a 10 percent by weight antibiotic activity, while the overall composition contains 16.83 percent of the salt. This composition is then administered orally in doses of 1.0, 2.0 and 4.5 g/kg. of cephalexin activity. For i.p. administration, the dicephalexin salt is formulated with a carrier in a 5 percent by weight active concentration (8.42 percent by weight of the salt) for administration in doses of 0.3, 0.5, 0.9 and 1.6 g/kg. cephalexin is used as a control, and is administered in the same dosages.

In addition, an anthraquinone-1,5-disulfonic acid disodium salt composition is prepared in a concentration of 25 percent by weight of the disodium salt in 5 percent acacia for oral administration, and a concentration of 10 percent by weight of the disodium salt in 5 percent acacia for i.p. administration.

The results of the toxicity tests are shown in the following table:

| Sample Route | $LD_{50}(g/kg)$ |
| --- | --- |
| Dicephalexin salt p.o. | >4.5 |
| Dicephalexin salt i.p. | >1.6 |
| Cephalexin p.o. | >4.5 |
| Cephalexin i.p. | 0.374 ± 0.033 |
| Disodium salt p.o. | >5.0($LD_0$) |
| Disodium salt i.p. | >2.0($LD_0$) |

The foregoing tests reveal that the dicephalexin salt of the invention is apparently no more toxic orally than cephalexin, and less toxic than cephalexin when administered intraperitoneally.

EXAMPLE 5

Preparation of cephalexin salt of anthraquinone-2-sulfonic acid.

A solution is prepared from 1.82 g(0.005 mole) of cephalexin monohydrate and 75 ml. of water containing 5 cc. of 0.1 N HCl. Thereafter, 0.005 mole of anthraquinone-2-sulfonic acid sodium salt is added to the folution, a crystalline precipitate is formed almost immediately. The precipitate is separated by filtration, washed with water, and is identified as the salt.

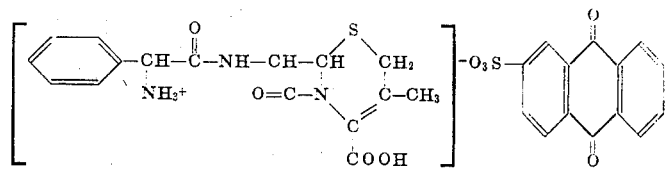

in nydrated form. It is found to have a solubility in water of 2 to 3 mg/ml.

Analysis: Calculated for $C_{30} H_{25} N_3 O_9 S_2 \cdot 3 H_2O$ C, 52.2 H, 4.5 N, 6.09 S, 9.26 S, 9.26 $H_2O$ 7.8

Found: C, 52.03 H, 3.98 N, 6.04 S, 9.30

By way of comparison, when the same procedure is used except for the use of anthraquinone-1-sulfonic acid sodium salt, no precipitate is formed. In fact, difficulty is incurred in the attempts to prepare the salt due to the fact that the sodium salt of anthraquinone-1-sulfonic acid is relatively insoluble in the reaction mixture.

EXAMPLE 6

Preparation of cephalexin salt of 1-naphthol-5-sulfonic acid.

Using the procedure described in Example 5, cephalexin monohydrate is reacted with the sodium salt of 1-naphthol-5-sulfonic acid. The resulting precipitate is identified as

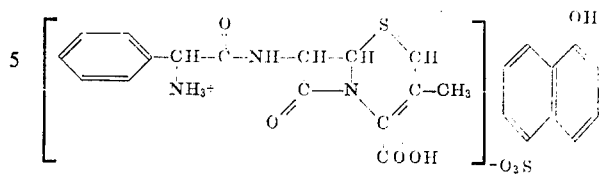

and is determined to have a solubility in water of about 5 mg/ml.

By way of comparison, when the above procedure is repeated using the sodium salts of 1-naphthol-4-sulfonic acid, 1-naphthol-8-sulfonic acid, 2-naphthol-6-sulfonic acid, 2-naphthol-7-sulfonic acid and 2-napthol-8-sulfonic acid, no precipitates are formed.

It will be apparent from the foregoing description that I have provided new and improved cephalexin salts which have at least comparable biological activity to cephalexin and yet are significantly more stable in the form of aqueous suspensions. It will also be apparent that the concepts of the invention are susceptible to a variety of other uses and application. For example, the salts of this invention can be used in the isolation and/or purification of cephalexin from the reaction mixture in the penicillin ring expansion process in which penicillin sulfoxide esters are converted to desacetoxycephalosporanic acid esters. Such a conversion process is described and claimed by Morin and Jackson in U. S. Pat. No. 3,275,626. Improvements in this process are described and claimed by Chauvette and Flynn in copending application, Ser. No. 574,311, filed Aug. 23, 1966, and by Cooper in copending applications, Ser. No. 636,629, Ser. No. 636,593 and Ser. No. 636,592, all filed May 8, 1967.

It will be understood that various changes and modifications can be made in the details of formulation, procedure and use without departing from the spirit of the invention, especially as defined in the following claims.

I claim:

1. A 7- [D-2'-phenyl-2'-aminoacetamido]-desacetoxycephalosporanic acid salt of sulfonic acid selected from the group consisting of anthraquinone-1,5-disulfonic acid, anthraquinone-2-sulfonic acid and 1-naphthol-5-sulfonic acid.

2. A salt as defined in claim 1 wherein said acid is anthraquinone-2-sulfonic acid.

3. A salt as defined in claim 1 wherein said acid is 1-naphthol-5-sulfonic acid.

4. Di[7-(D-2'-phenyl-2'-aminoacetamido)-desacetoxycephalosporanic acid]anthraquinone-1,5-disulfonate.

* * * * *